United States Patent
Yeung et al.

(10) Patent No.: US 10,994,202 B2
(45) Date of Patent: May 4, 2021

(54) SIMULATED PREVIEWS OF DYNAMIC VIRTUAL CAMERAS

(71) Applicant: Intel Corporation, Santa Clara, CA (US)

(72) Inventors: Fai Yeung, Palo Alto, CA (US); Patrick Youngung Shon, Milpitas, CA (US); Gilson Goncalves De Lima, San Francisco, CA (US); Vasanthi Jangala Naga, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/749,969

(22) Filed: Jan. 22, 2020

(65) Prior Publication Data

US 2020/0368619 A1  Nov. 26, 2020

(51) Int. Cl.
| | |
|---|---|
| *A63F 13/5258* | (2014.01) |
| *G06T 19/00* | (2011.01) |
| *G06F 3/01* | (2006.01) |
| *G06T 15/20* | (2011.01) |
| *G06T 17/05* | (2011.01) |

(52) U.S. Cl.
CPC ......... *A63F 13/5258* (2014.09); *G06F 3/011* (2013.01); *G06T 15/20* (2013.01); *G06T 17/05* (2013.01); *G06T 19/006* (2013.01)

(58) Field of Classification Search
CPC ...... A63F 13/5258; G06F 3/011; G06T 15/20; G06T 19/006; G06T 17/05
USPC .................................. 348/36, 47, 48, 218.1
See application file for complete search history.

(56) References Cited

U.S. PATENT DOCUMENTS

2019/0335166 A1* 10/2019 Copley .............. H04N 5/23238

* cited by examiner

*Primary Examiner* — Justin V Lewis
(74) *Attorney, Agent, or Firm* — Schwabe, Williamson & Wyatt, P.C.

(57) ABSTRACT

The present disclosure includes a method for generating simulated previews of dynamic virtual cameras, the method comprising receiving virtual camera descriptor data, receiving object tracking data, generating virtual camera behavior data based on the virtual camera descriptor data and the object tracking data, the virtual camera behavioral data corresponding to virtual camera parameters for rendering a view, and generating a simulated preview based on the object tracking data and the virtual camera behavioral data.

20 Claims, 10 Drawing Sheets

SIMULATED PREVIEWS OF DYNAMIC VIRTUAL CAMERAS

BACKGROUND

The present disclosure pertains to virtual cameras, and more specifically, to simulated previews of dynamic virtual cameras.

Free-View-Point (FVP) technology has been made popular by Hollywood in the early 2000s by movies such as the Matrix trilogy. Using FVP, certain moments in the video stream may depict a frame frozen in time, followed by views equivalent to a camera orbiting around the main subject of the action scene taking place. An equivalent camera showing video streams derived from numerous other actual cameras is sometimes referred to as a virtual camera. Such a special effect is accomplished by capturing a scene with an array of synchronized and calibrated physical cameras as illustrated in FIG. 1A. FIG. 1A illustrates a sports arena 101 where numerous physical cameras 110 are capturing a target 150 on a playing field 102. The data collected can be then processed, for example, using computer vision algorithms for segmenting the subject of interest from the rest of scene and creating a realistic texture-mapped 3D model. This model allows rendering of the subject from arbitrary viewpoints, creating the impression that one or more virtual cameras are moving around a target along an arbitrary 3D trajectory, for example.

Advances in FVP technology have allowed FVP to be used in a variety of application, such as sporting events, for example. In multi-camera live production of sporting events, a producer/director may select a camera view that can provide the most compelling experience to the viewer. In other words, they choose a camera view with the best intrinsic and extrinsic parameters that offer the fans the most relevant view in the current context of the game. When a sports event is broadcast with HD images rendered by virtual cameras freely moving in reconstructed 3D action, the producer/director may be required to preview their virtual camera settings with intrinsic and extrinsic camera parameters before the real-time rendering process begins.

Traditionally, the production of FVP clips has faced challenges including sometimes high manual interaction, high computing power requirements, and latency. While advances in computing have reduced the time for generating FVP video, as seen in instant replays of professional sporting events, for example, a cost effective, technically viable solution for extending FPV to live (or nearly live) action would be advantageous.

It is with respect to these considerations and others that the disclosure made herein is presented. This Background is provided to introduce a brief context for the Detailed Description that follows. This Background is not intended to be an aid in determining the scope of the claimed subject matter nor be viewed as limiting the claimed subject matter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
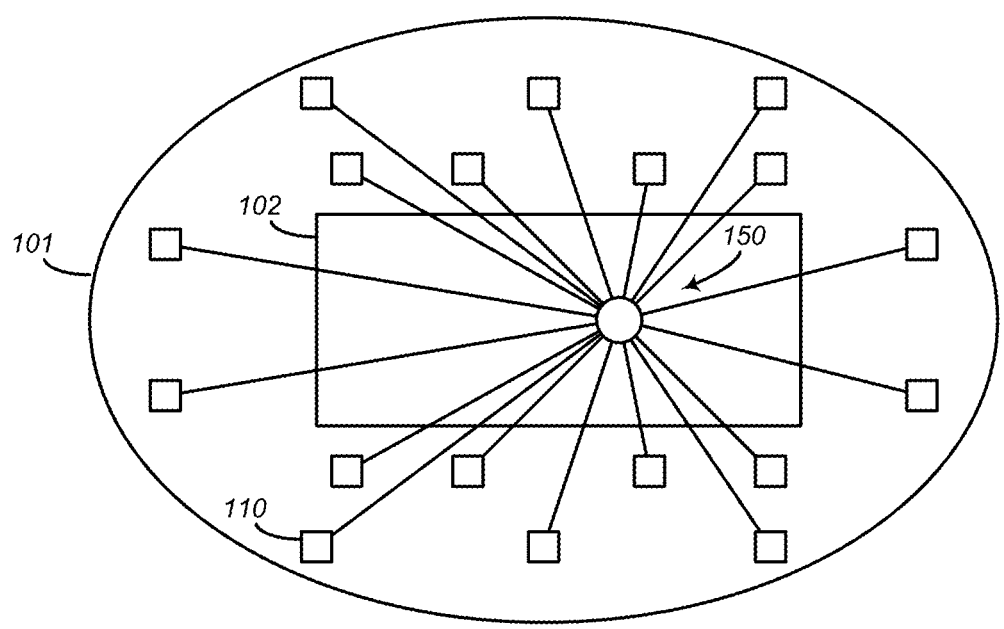
FIG. 1A illustrates physical cameras capturing a target from a plurality of angles to produce a virtual camera.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Features and advantages of the present disclosure include generating simulated previous of dynamic virtual cameras, which may be used in the production of a free-view-point broadcast (FVPB) video, such as a sporting event as described in more detail below, for example.

In order to offer higher value to the viewers of FVPB compared to the viewers of a regular broadcast, the virtual cameras offered for consumption for the broadcast may include what the real cameras can offer and as well offer never-seen-before experiences. The following are six example camera experiences (one static and five dynamic) that may be used in a FVPB event according to various embodiments.

1. Static Virtual Cameras

A static virtual camera is equivalent to a real camera installed in a venue with no cameraman. For added value, what can be offered in an FVPB scenario is an equivalent static virtual camera in an impractical location of the venue, for example, in a location where it would pose hazard to the players or to the camera equipment itself 2. Dynamic Stationary Virtual Cameras Stationary virtual cameras are virtual cameras installed in a fixed location, but that track a target. That target can be either an object, such as a ball or a player. Stationary virtual cameras have an equivalent in the real world: a camera with a cameraman. Stationary virtual cameras may be moved according to the output of a computer vision tracking algorithm that provides target tracking information, for example.

3. Mobile-Follows-Target Virtual Cameras

These types of virtual cameras may move in 3D space and follow a target. A good analogy to this type of camera would be to have a broadcast camera mounted on a drone. Just like the stationary virtual camera, the mobile-follows-target virtual camera may be following either a ball or a player, for example.

4. Mobile-Follows-Two-Targets Virtual Cameras

This type of virtual camera differs from the mobile-follows target camera by the fact that it may cover two targets under certain conditions. For example, there may be a threshold, above which one of the two set targets will have the preference in the tracking algorithm (e.g., where the virtual camera breaks off one target and just tracks the remaining target).

5. Rail Virtual Cameras

Rail virtual cameras may move in a linear path, with pre-determined start point and length. These cameras can also be set to follow a target. One example equivalent of a rail virtual camera is an actual sky camera in American Football.

6. Be-The-Target Virtual Cameras

The behavior of this type of virtual camera is equivalent of having a head-mounted camera on a target in the scene (e.g., a player) of your choice.

Based on the various forms virtual cameras can take, it can be seen that it would be beneficial for a producer to have a specialized tool that allows such person to properly build an entertainment experience (e.g., for a sporting event) before the broadcast is released, which in some embodiments may be a live (or nearly live) broadcast of some activity. One of the aspects of this production is the pre-visualization of the virtual cameras. Production of such content according to various embodiments disclosed herein may be done with a low cost and low latency, for example. Previously, the creation of FVPB coverage for some applications has suffered from a significant cloud computing cost and long latency (e.g., ninety-second per camera parameter change). Because of those factors, it may be very challenging to use a full 3D reconstruction pipeline for the pre-production of a FVPB broadcast.

Figure 3:
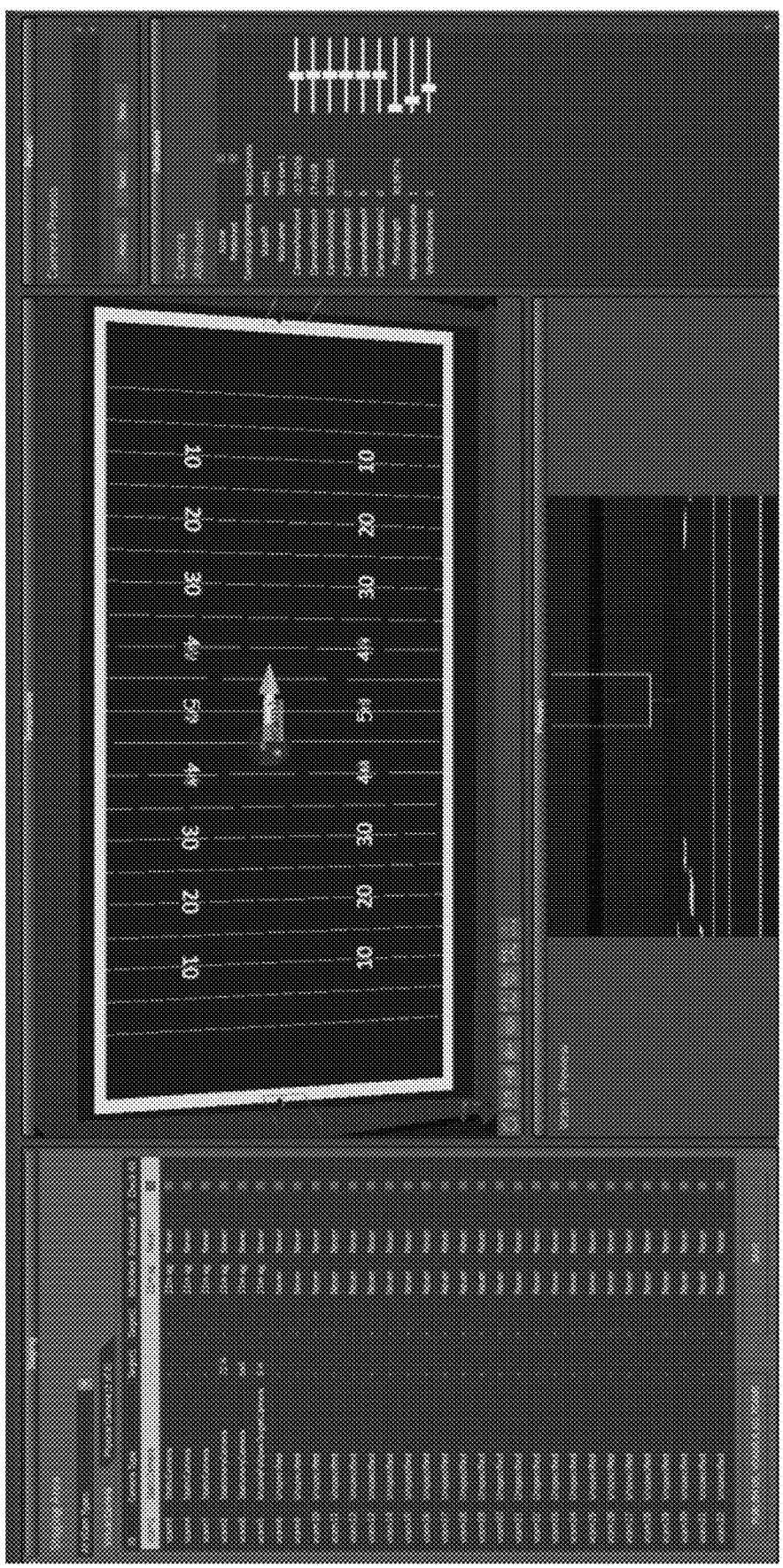
FIG. 3 illustrates another example user interface for a simulated preview software apparatus according to an embodiment.

For static cameras setup, embodiments of the present disclosure may include software that uses a 3D model of a subject environment (e.g., a sports venue) to allow a producer to place and visualize the virtual camera locations and orientations in 3D. The software may allow the user to preview the virtual camera viewpoint using the venue 3D model. The rendering and previewing may be done locally (e.g., using local computing resources rather than cloud computing), and thus the production of an event with static cameras may be done with parameter editing in real time (e.g., as illustrated in FIG. 3 below).

For the dynamic cameras preview, embodiments of the present disclosure may provide the producer with mechanisms to adjust the dynamic camera experiences in a both reliable and low-latency manner. In the description that follows, a variety of scenarios are described addressing how to preview dynamic cameras in a low-latency fashion. In some example embodiments, there may be two components of software for each of these scenarios: one that allows the producer to create virtual camera descriptor data, and another that consumes tracking data with the virtual camera descriptor data and generates a sequence of files with the expected virtual camera behavior.

Figure 1B:
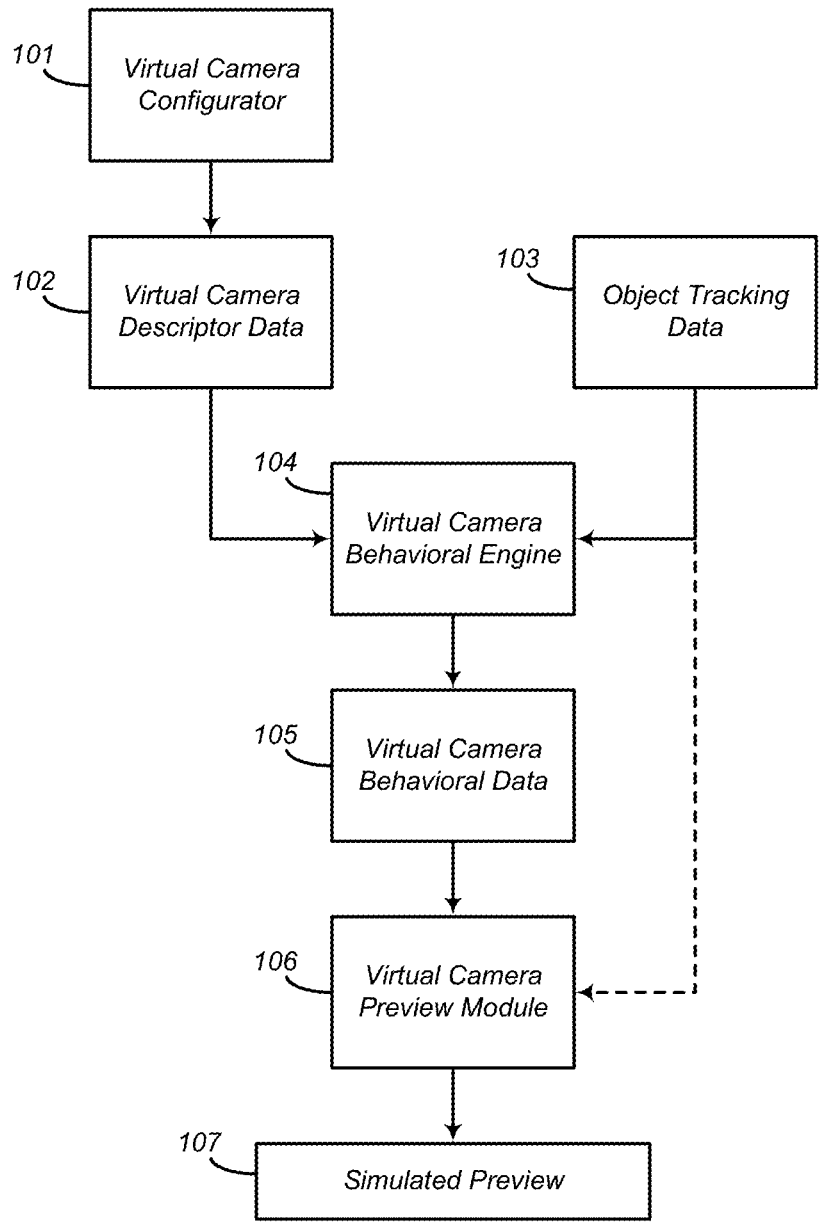
FIG. 1B illustrates generating a simulated preview according to one embodiment.

FIG. 1B illustrates generating a simulated preview according to one embodiment. As illustrated in FIG. 1B, features and advantages of the present disclosure may include receiving virtual camera descriptor data 102 from a virtual camera configurator software system 101, receiving object tracking data 103, and generating (e.g., by a virtual camera behavioral engine 104) virtual camera behavior data 105 based on the virtual camera descriptor data 102 and the object tracking data 103. The virtual camera behavioral data 105 may corresponding to virtual camera parameters for rendering a view, for example. Finally, the system may generate (e.g., by a virtual camera preview module 106) a simulated preview 107 based on the object tracking data 103 and the virtual camera behavioral data 105. For illustrative purposes, examples of data are attached hereto as Appendices. For instance, example object tracking data according to one embodiment is illustrated in Appendix A. Similarly, example virtual camera behavioral data according to one embodiment is illustrated in Appendix B. Finally, example virtual camera descriptor data according to one embodiment is illustrated in Appendix C.

Figure 2A:
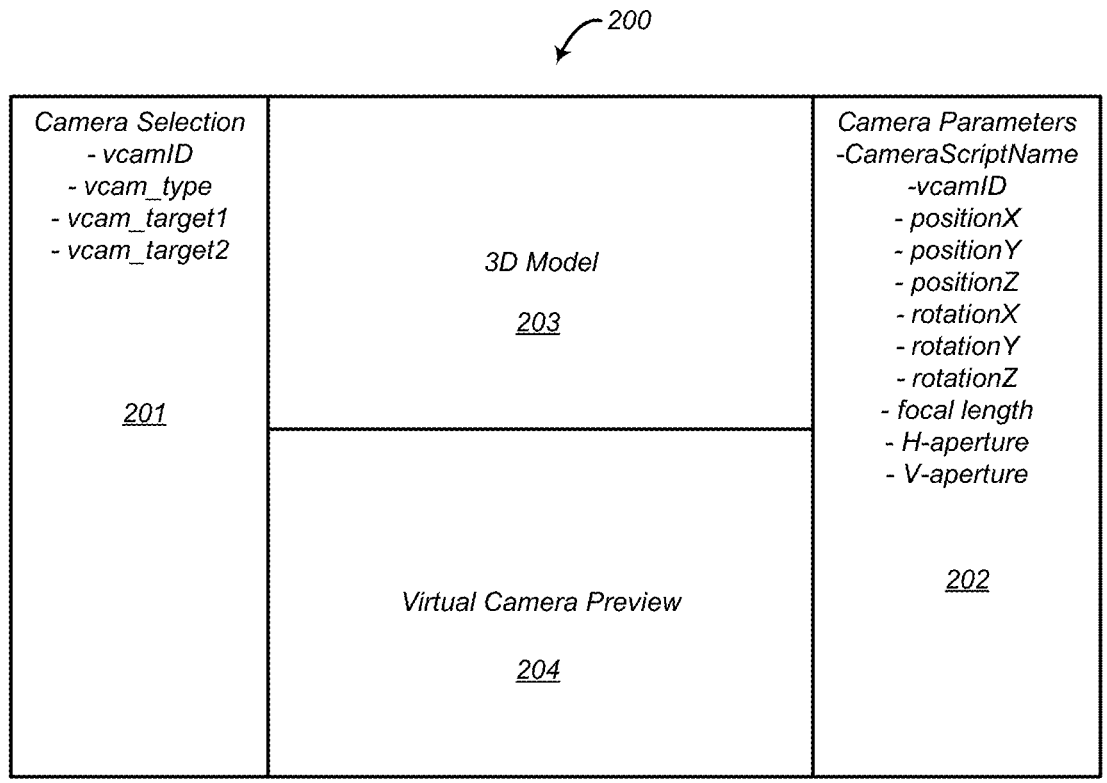
FIG. 2A illustrates an example user interface for a simulated preview software apparatus according to an embodiment.
Figure 4A:
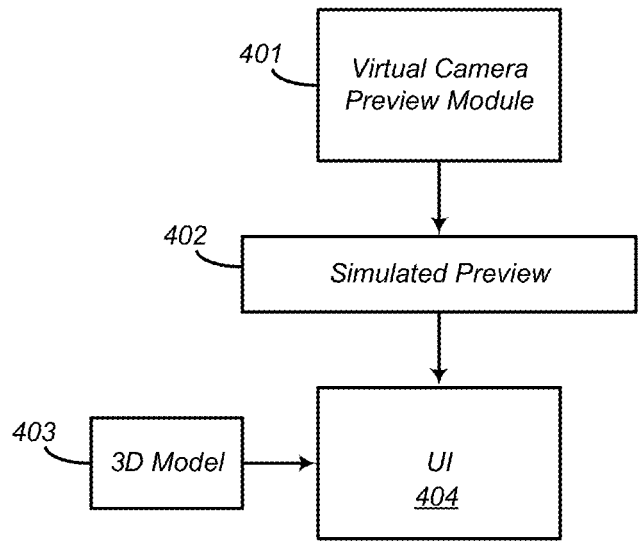
FIG. 4A illustrates generating a simulated preview according to another embodiment.

Virtual camera configurator 101 may be a software component that allows the producer to alter camera parameters and create a virtual camera descriptor file 102. FIG. 2A illustrates an example user interface 200 for a simulated preview software apparatus according to an embodiment. Interface 200 of a virtual camera configurator may include a plurality of virtual cameras a user can select at 201, which may be identified by a virtual camera identifier (vcamID), a virtual camera type (vcam_type) (e.g., of the virtual camera types described above), and one or more targets the virtual camera may be tracking (e.g., vcam_target1 and vcam_target2), for example. Interface 200 may further include a 3D model of the environment (e.g., a sports venue) 203, a virtual camera preview pane 204, and user configurable camera parameters 202, including but not limited to vcamID, x-position, y-position, z-position, x-rotation, y-rotation, z-rotation, focal length, horizontal aperture, and vertical aperture, for example. FIG. 4A illustrates generating a simulated preview in a user interface according to an embodiment. In this example, a virtual camera preview module 401 generates a simulated preview 402. The simulated preview 402 and a 3D model are received by a user interface 404 and superimposed in a preview pane, for example. Another example virtual camera configurator used for production of a football game and further illustrating the preview pane and 3d model is illustrated in FIG. 3.

Referring again to FIG. 1B, virtual camera behavioral engine 104 is a software component that may consume a virtual camera descriptor data and a sequence of files containing object tracking data 103 (e.g., player and ball tracking data) and may generate a sequence of output data describing the behavior (e.g., location, FOV, focal length, aspect ratio) per frame of a virtual camera, for example.

Virtual camera preview module 106 is a software component that may be responsible for rendering the viewpoint of the virtual camera corresponding to the descriptor data 102 provided to the virtual camera behavioral engine 104. Virtual camera preview module 106 may further render dynamic scenes observed by the virtual camera being worked on. In some embodiments, virtual camera preview module 106 may describe the tracked objects movement according to the tracking data which may also be provided to the virtual camera preview module 106, for example.

A description of one example of the data components shown in FIG. 1B is as follows. The virtual camera descriptor data 102 may be data that includes parameters referring to the camera type being simulated. It may include information such as initial camera location, focal length, chosen targets to be followed and other virtual-camera-type-related parameters, for example. Object tracking data 103 may include a per-frame collection of files that inform, among other things, an estimate of the target position in space and an estimate of the center of mass of some of the targets during a certain time (e.g., during a particular game of game play). Object tracking data 103 may correspond to data for tracking players and/or a ball, for example.

Virtual camera behavior data 105 may be used for preview purposes and may include the basic camera parameters used for rendering a virtual camera view using computer graphics. Advantageously, if a new type of virtual camera is created, when the system attempts to recreate its viewpoint using computer graphics, the same virtual camera parameters may be used for the rendering engine (e.g., look vector, up vector, focal length, field of view, aspect ratio and location) whether the camera is a pre-existing or new virtual camera. These parameters may be stored as the virtual camera behavioral data 105, for example.

Simulated preview 107 comprises an animation of targets (e.g., players and the ball), according to the available tracking information, superposed on the 3D model of the surrounding environment (e.g., of a sports venue), covered by a virtual dynamic camera whose movement and basic properties are dictated by the virtual camera behavior data 105. A video producer may watch the clip in a continuous way or play it back and forth using standard video control buttons.

Figure 4B:
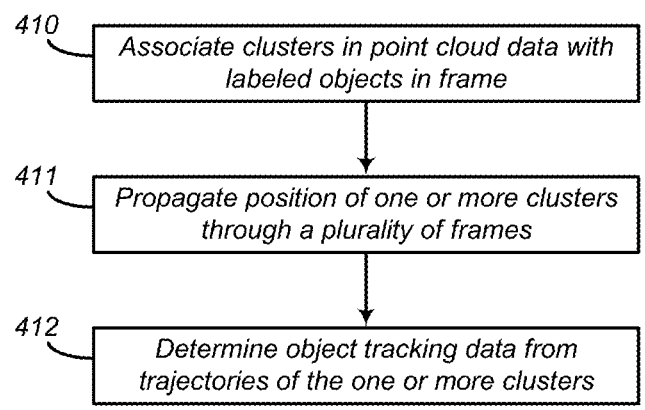
FIG. 4B illustrates generating object tracking data according to an embodiment.

In various embodiments described herein, various different types of input data may be received by preview module 106. The architecture of FIG. 1B may support a variety of different forms of input data to produce a simulated preview 107. Furthermore, as described in more detail below, a computer vision tracking algorithm may be included, which may receive and consume frames from physical broadcast cameras and produce the object tracking data 103. In some embodiments, the tracking data may be estimates of the players' and the ball's locations, for example. FIG. 4B illustrates generating object tracking data according to an embodiment. In this example, object tracking data may be generated from point cloud data comprises. For instance, at 410, clusters in the point cloud data may be associated with one or more labeled objects in at least one frame of a sequence of frames. At 411, the position(s) of the associated clusters may be propagated through a plurality of frames of the sequence of frames. At 412, the object tracking data may be determined from the trajectories of the associated clusters.

Figure 2B:
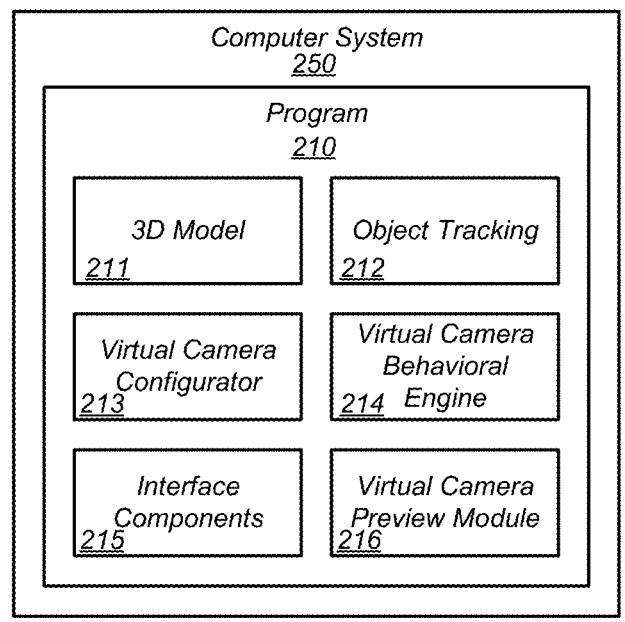
FIG. 2B illustrates an example computer program comprising software modules for generating a simulated preview according to an embodiment.

FIG. 2B illustrates an example computer program comprising software modules for generating a simulated preview according to an embodiment. In various embodiments, the present disclosure may include computer system 250 for generating simulated previews of dynamic virtual cameras. The system may include one or more processors and a non-transitory machine-readable medium storing a program 210 executable by the one or more processors, wherein the program comprising sets of instructions for performing the techniques described herein, for example. In this example, the modules include a 3D model 211, which may represent a surrounding environment that certain targets are in (e.g., a sports venue). The modules may include an object tracking module 211, virtual camera configurator module 213, a virtual camera behavioral engine 214, and virtual camera preview module 215 as described above, for example. The modules may further include interface components for receiving data from cameras, for example, and generating one or more user interfaces such as user interface 200 of FIG. 2 or the user interface in FIG. 3, for example.

Example Implementation

Figure 5:
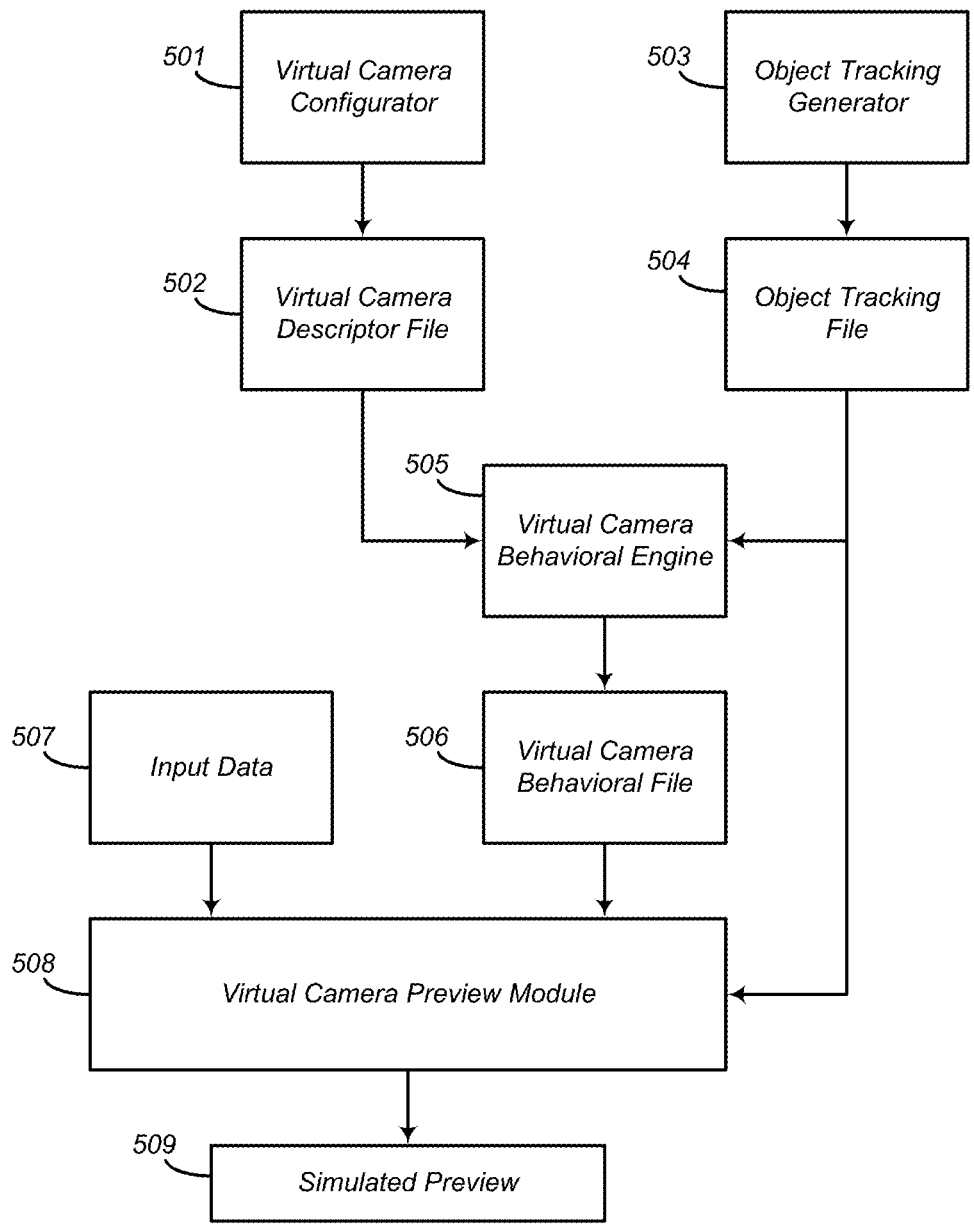
FIG. 5 illustrates generating a simulated preview according to an example embodiment.

FIG. 5 illustrates generating a simulated preview for a sporting event according to an example embodiment. In this example embodiment, a computer software program may include software modules including a virtual camera configurator 501, an object (e.g., player) tracking generator 503, a virtual camera behavior engine 505, and a virtual camera preview module 508, for example. In this example, virtual camera configurator 501 produces a virtual camera descriptor file 502 and object tracking generator 503 produces an object (e.g., player and/or ball) tracking file 504, which are combined in virtual camera behavioral engine 505 to produce one or more virtual camera behavior files 506. Object tracking file 504 and virtual camera behavioral file 506, together with various forms of input data 507 described in more detail below, are combined in virtual camera preview module 506 to produce simulated previews 509. The software modules and data are thus configured to produce simulated preview clips of dynamic virtual cameras that may, for example, use local rendering (e.g., without the use of cloud computing) with low-latency to parameter changes. Accordingly, some embodiments of the present disclosure may reduce game production time and support creation of free-view-point sports events.

Features and advantages of the present architecture may support generating simulated previews based on a number of different scenarios. For example, in one scenario the input data may be a collection of categorized-by-play point clouds with ball and player tracking data, for example. In this case, the preview may be done per play, for example, and actual player and ball point clouds are used on the preview. In another scenario, the input data may be a single dataset of point clouds with ball and player tracking data. In this case, a preview may be done for a particular play. In this case, actual player and ball point clouds are used on the preview. In yet another scenario, the input data may be ball and player tracking data, but no point cloud data, for example, and a preview may be done using computer generated (e.g., non-articulated player) models, which may move according to the tracking data. In another scenario, the input data may be a single dataset with point clouds, but no tracking data may be available. In this case, tracking data may be generated (e.g., using machine learning, which may be unsupervised). In some embodiments, tracking data may be generated from LIDAR, for example.

Figure 6:
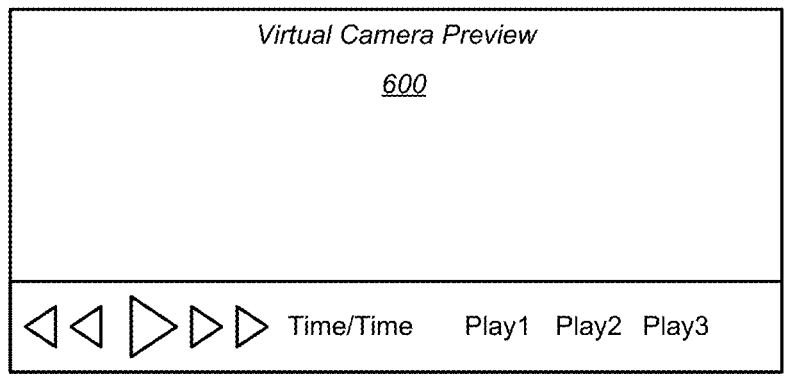
FIG. 6 illustrates a user interface for a dynamic virtual camera preview according to an embodiment.
Figure 8:
FIG. 8 illustrates a preview interface according to an example embodiment.

More specifically, the first scenario, the input data 507 of FIG. 5 may be a collection of categorized plays in the form of point cloud sequences, and the tracking data 504 may be player and ball tracking data. FIG. 6 depicts a potential UI interface for the dynamic virtual camera preview when this is the data available. FIG. 6 may refer to a basketball game, for example, and show the court, players, and ball in virtual camera preview section 600, for example. Since point cloud data is available for categorized plays, the UI offers some of those plays for selection at the bottom of the screen: play 1, play2, play 3, which may be a fast break, 3 pointer, and free throw, for example. The UI may also include typical controls such a Play arrow and fast forward and reverse arrows as shown together with a current runtime and a total runtime of the clip, for example. Another example interface for this scenario is shown in FIG. 8.

Figure 7:
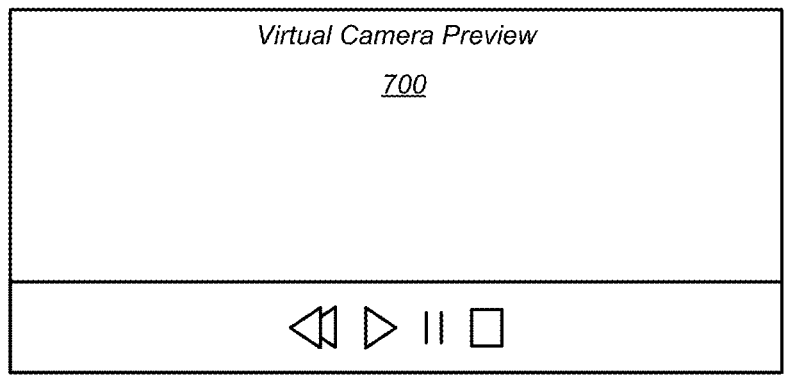
FIG. 7 depicts a user interface for the dynamic virtual camera preview according to another embodiment.
Figure 9:
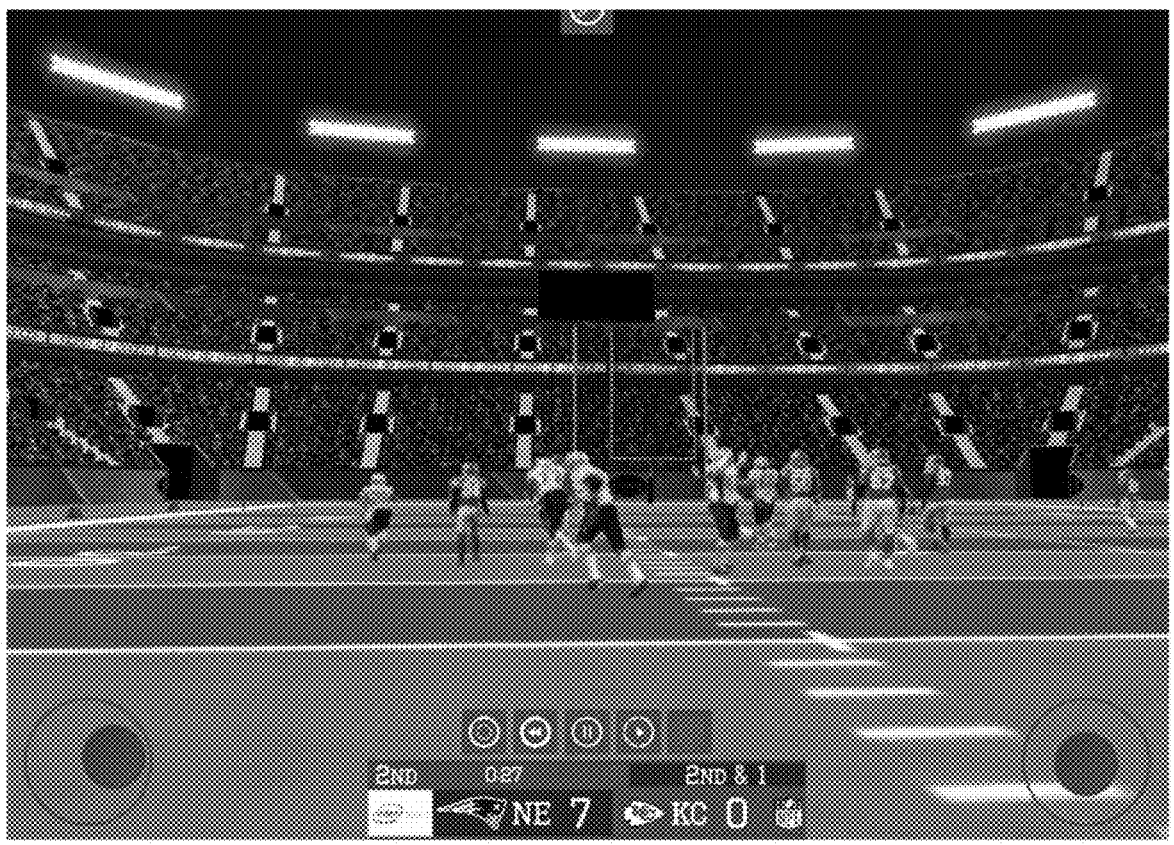
FIG. 9 illustrates a preview interface according to another example embodiment.

As mentioned above, a second scenario, the input data 507 may be a single play, in the form of a point cloud sequence, with player and ball tracking data 504. FIG. 7 depicts a potential UI interface for the dynamic virtual camera preview when this is the data available. FIG. 7 may refers to a football game, for example. Since this example may not include data available for categorized plays, the UI offers only standard video manipulation controls (e.g., play, pause, stop, and rewind). Another example interface for this scenario is shown in FIG. 9.

In the third scenario, the input data 507 may be a single play, in the form of a point cloud sequence, without player and ball tracking data 504. In this example, the tracking may be artificially produced. FIG. 4B above disclosed one technique to generate tracking data from the point cloud files using machine learning to create simulated tracking data so we can deliver the preview clips, for example.

Figure 10:
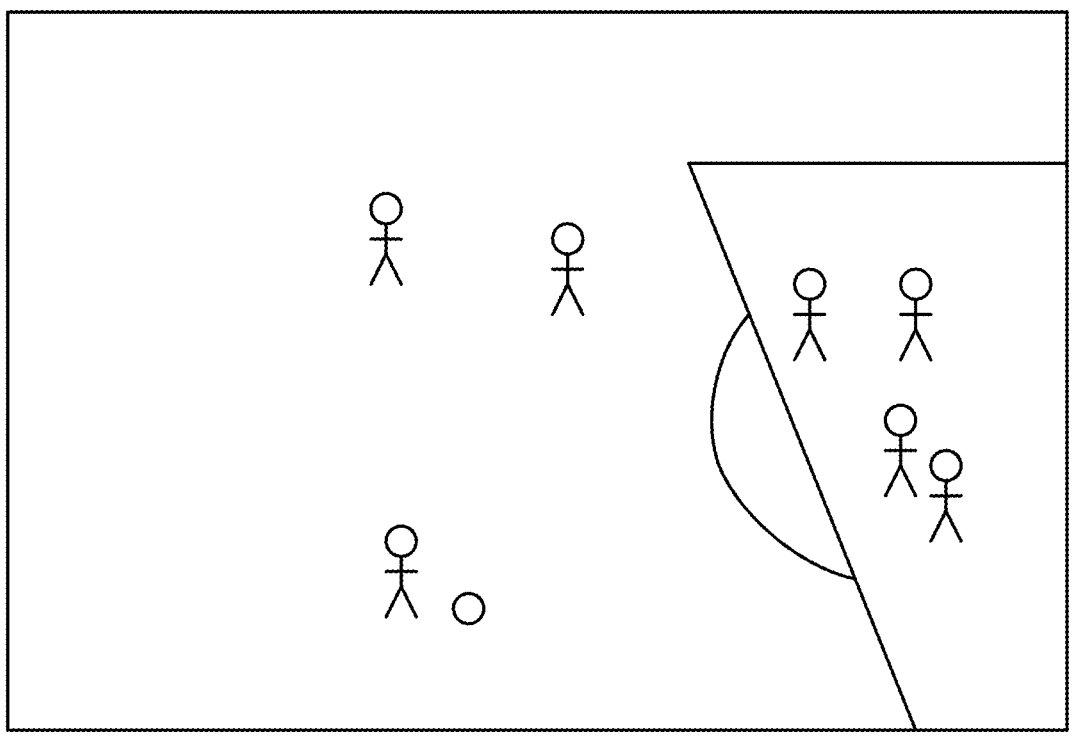
FIG. 10 illustrates a simplified preview according to yet another example embodiment.

In a fourth scenario, the input data 507 may be a single play with player and ball tracking data, but no point cloud sequence. In this case, since there is no point cloud data, the system may generate non-articulated player and ball computer generated graphics models, for example, whose movement may be specified by the available tracking data. An simplified example of such a preview is shown in FIG. 10.

In another scenario, input data 507 may comprise a single play, in the form of a LIDAR based 3D point cloud sequence, without player and ball tracking data. In this case, there may be a need to prepare for a game of a certain sport modality but there's no usable data available. For example, the system may only have data referring to American football, but it is desired to produce a baseball game. A camera rig installation may not be ready to capture baseball data and no such data (neither point clouds nor tracking data) may be available. Features and advantages of the present disclosure may include capturing the point cloud data using light detection and ranging ("LIDAR") technology (as is known by those skilled in the art, for example, in the prototypes of self-driving cars) and proceeding it as in the fourth scenario described above. LIDAR may be used, for example, to synthesize object tracking data from LIDAR point clouds. LIDAR (aka, "LiDAR," and "LADAR") is a surveying method that measures distance to a target. In some example applications, LIDAR works by illuminating the target with laser light and measuring the reflected light with a sensor. Differences in laser return times and wavelengths can then be used to make digital 3D representations of the target, for example.

Example Computing Environment

Figure 11:
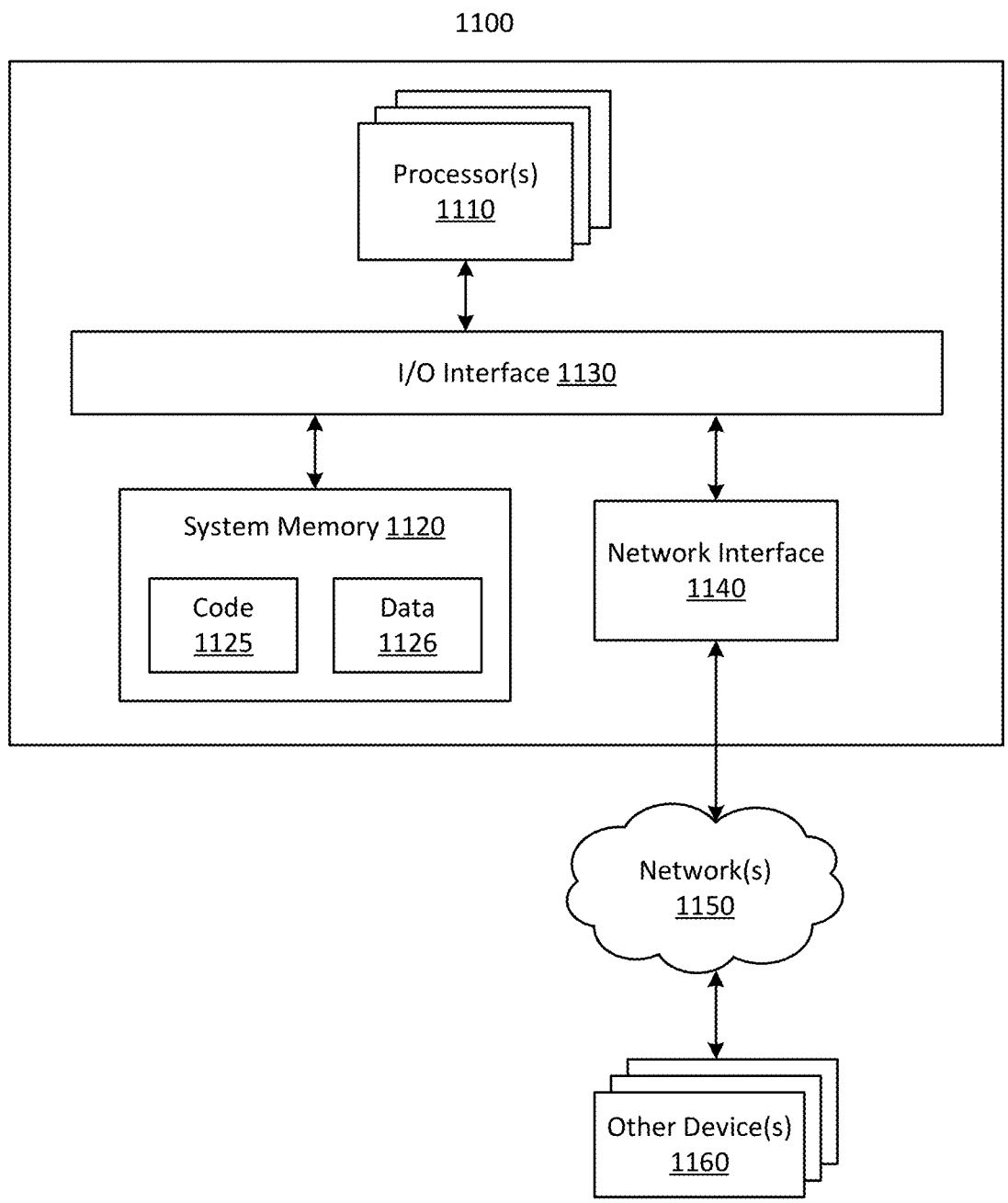
FIG. 11 illustrates hardware of a special purpose computing machine configured according to the above disclosure.

FIG. 11 and the following discussion are intended to provide a brief general description of a suitable computing environment in which the methods and systems disclosed herein and/or portions thereof may be implemented. Although not required, the methods and systems disclosed herein are described in the general context of computer-executable instructions, such as program modules, being executed by a computing device. Generally, program modules include routines, programs, objects, components, data structures and the like that perform particular tasks or implement particular abstract data types. The methods and systems disclosed herein may also be practiced in distributed computing environments where program modules may be located in both local and remote memory storage devices.

In describing various examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. The specific features, acts, and mediums are disclosed as example forms of implementing the claims In at least some embodiments, a computing device 1100 that implements a portion or all of one or more of the technologies described herein, including the techniques to implement the functionality described above, may include one or more processors 1110 configured to access one or more computer or machine readable media (e.g., memory 1120). FIG. 11 illustrates such a general-purpose computing device 1100. In the illustrated embodiment, computing device 1100 includes one or more processors 1110 coupled to a system memory 1120 via an input/output (I/O) interface 1130. Computing device 1100 further includes a network interface 1140 coupled to I/O interface 1130.

In various embodiments, computing device 1100 may be a uniprocessor system including one processor 1110 or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as an x86 central processing unit (CPU) and/or various graphics processors (GPUs), or ARM based processors or any other suitable ISA. In multiprocessor systems, each of processors 1110 may commonly, but not necessarily, implement the same ISA, while in other embodiments combinations of different processors may be used (e.g., CPUs and GPUs). Processors 1110 may further be embodied as one or more microcontrollers, for example.

System memory 1120 may be configured to store instructions and data accessible by processor(s) 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1120 as code 1125 and data 1126.

In one embodiment, I/O interface 1130 may be configured to coordinate I/O traffic between processor 1110, system memory 1120, and any devices, including network interface 1140 or other peripheral interfaces. In some embodiments, I/O interface 1130 may perform any necessary protocol, timing, or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other device or devices 1160 attached to a network or network(s) 1150, for example. In various embodiments, network interface 1140 may support communication via any suitable wired or wireless general data networks, such as types of Ethernet networks, for example. Additionally, network interface 1140 may support communication via telecommunications/telephony networks such as analog voice networks or digital fiber communications networks, via storage area networks such as Fibre Channel SANs or via any other suitable type of network and/or protocol.

In some embodiments, system memory 1120 may be one embodiment of a computer-accessible medium configured to store program instructions and data as described above for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1100 via I/O interface 1130. A non-transitory computer-accessible storage medium may also include any volatile or non-volatile media, such as RAM (e.g. SDRAM, DDR SDRAM, RDRAM, SRAM, etc.), ROM, FLASH, etc., that may be included in some embodiments of computing device 1100 as system memory 1120 or another type of memory. Portions or all of multiple computing devices, such as those illustrated in FIG. 11, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

The various features and processes described above may be used independently of one another or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Additional Examples

Each of the following non-limiting examples may stand on its own, or may be combined in various permutations or combinations with one or more of the other examples.

Example 1 is a method for generating simulated previews of dynamic virtual cameras, the method comprising: receiving virtual camera descriptor data; receiving object tracking data; generating virtual camera behavior data based on the virtual camera descriptor data and the object tracking data, the virtual camera behavioral data corresponding to virtual camera parameters for rendering a view; and generating a simulated preview based on the object tracking data and the virtual camera behavioral data.

Example 2 is the method of Example 1 further comprising receiving a three-dimensional (3D) model, wherein the simulated preview is superimposed on the 3D model.

Example 3 is the subject matter of any one or more of Examples 1-2 where the 3D model corresponds to a sports venue.

Example 4 is the subject matter of any one or more of Examples 1-3 further comprising receiving one or more sequences of point cloud data.

Example 5 is the subject matter of any one or more of Examples 1-4 further comprising receiving a plurality of categorized sequences of point cloud data.

Example 6 is the subject matter of any one or more of Examples 1-5 further comprising generating the object tracking data from the point cloud data.

Example 7 is the subject matter of any one or more of Examples 1-6 wherein the object tracking data is generated from the point cloud data using at least one machine learning algorithm.

Example 8 is the subject matter of any one or more of Examples 1-7 wherein generating the object tracking data from the point cloud data comprises: associating clusters in the point cloud data with one or more labeled objects in at least one frame of a sequence of frames; propagating a position of the associated clusters through a plurality of frames of the sequence of frames; and determining the object tracking data from the trajectories of the associated clusters.

Example 9 is the subject matter of any one or more of Examples 1-8 wherein the labeled objects are one or more players of a sporting event or a ball in a sporting event.

Example 10 is the subject matter of any one or more of Examples 1-9 wherein the point cloud data is a light detection and ranging (LIDAR) based 3D point cloud sequence.

Example 11 is the subject matter of any one or more of Examples 1-10 implemented on a non-transitory machine-readable medium storing a program executable by one or more processors, the program comprising sets of instructions for performing the techniques of Examples 1-10.

Example 12 is a computer system for generating simulated previews of dynamic virtual cameras, the system comprising: one or more processors; a non-transitory machine-readable medium storing a program executable by the one or more processors, the program comprising sets of instructions for implementing the subject matter of any one or more of Examples 1-10.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method for operating a dynamic virtual camera that shows video streams derived from video streams of a plurality of actual cameras, the method comprising:
   receiving virtual camera descriptor data describing at least an experience to be provided by the virtual camera, including one or more objects to be followed;
   receiving object tracking data describing estimated positions of the one or more objects in a plurality of points in time;
   generating virtual camera behavioral data based on the virtual camera descriptor data and the object tracking data, the virtual camera behavioral data corresponding to virtual camera parameters that include parameters for the actual cameras, for the virtual camera to render one or more views of the one or more objects at one or more points in time; and
   generating a simulated preview of the one or more objects at a point in time, based on the object tracking data and the virtual camera behavioral data.

2. The method of claim 1, further comprising receiving a three-dimensional (3D) model, wherein the simulated preview is superimposed on the 3D model.

3. The method of claim 2, wherein the 3D model corresponds to a sports venue.

4. The method of claim 1, further comprising receiving one or more sequences of point cloud data.

5. The method of claim 4, further comprising receiving a plurality of categorized sequences of point cloud data.

6. The method of claim 4, further comprising generating the object tracking data from the point cloud data.

7. The method of claim 6, wherein the object tracking data is generated from the point cloud data using at least one machine learning algorithm.

8. The method of claim 6, wherein generating the object tracking data from the point cloud data comprises:
   associating clusters in the point cloud data with one or more labeled objects in at least one frame of a sequence of frames;
   propagating a position of the associated clusters through a plurality of frames of the sequence of frames; and
   determining the object tracking data from trajectories of the associated clusters.

9. The method of claim 8, wherein the labeled objects are one or more players of a sporting event or a ball in a sporting event.

10. The method of claim 4, wherein the point cloud data is a light detection and ranging (LIDAR) based 3D point cloud sequence.

11. A computer system for generating a simulated previews of a dynamic virtual camera that shows video streams derived from a plurality of actual cameras, the system comprising:
   one or more processors;
   a non-transitory machine-readable medium storing a program executable by the one or more processors, the program comprising sets of instructions for:
   receiving virtual camera descriptor data describing at least an experience to be provided by the virtual camera, including one or more objects to be followed;
   receiving object tracking data describing estimated positions of the one or more objects in a plurality of points in time;
   generating virtual camera behavioral data based on the virtual camera descriptor data and the object tracking data, the virtual camera behavioral data corresponding to virtual camera parameters that include parameters for the actual cameras, for the virtual camera to render one or more views of the one or more objects at one or more points in time; and
   generating a simulated preview of the one or more objects at a point in time, based on the object tracking data and the virtual camera behavioral data.

12. The system of claim 11, further comprising receiving a three-dimensional (3D) model, wherein the simulated preview is superimposed on the 3D model.

13. The system of claim 11, further comprising receiving one or more sequences of point cloud data.

14. The system of claim 13, further comprising receiving a plurality of categorized sequences of point cloud data.

15. The system of claim 13, further comprising generating the object tracking data from the point cloud data using at least one machine learning algorithm.

16. A non-transitory machine-readable medium storing a program executable by one or more processors, the program comprising sets of instructions for generating a simulated preview of a dynamic virtual camera that shows video streams derived from a plurality of actual cameras, including:
   receiving virtual camera descriptor data describing at least an experience to be provided by the virtual camera, including one or more objects to be followed;
   receiving object tracking data describing estimated positions of the one or more objects in a plurality of points in time;
   generating virtual camera behavioral data based on the virtual camera descriptor data and the object tracking data, the virtual camera behavioral data corresponding to virtual camera parameters that include parameters for the actual cameras, for the virtual camera to render one or more views of the one or more objects at one or more points in time; and
   generating a simulated preview of the one or more objects at a point in time, based on the object tracking data and the virtual camera behavioral data.

17. The non-transitory machine-readable medium of claim 16, further comprising sets of instructions for receiving a three-dimensional (3D) model, wherein the simulated preview is superimposed on the 3D model.

18. The non-transitory machine-readable medium of claim 16, further comprising sets of instructions for receiving one or more sequences of point cloud data.

19. The non-transitory machine-readable medium of claim 18, further comprising sets of instructions for receiving a plurality of categorized sequences of point cloud data.

20. The non-transitory machine-readable medium of claim 18, further comprising sets of instructions for generating the object tracking data from the point cloud data using at least one machine learning algorithm.

* * * * *

UNITED STATES PATENT AND TRADEMARK OFFICE
CERTIFICATE OF CORRECTION

PATENT NO. : 10,994,202 B2
APPLICATION NO. : 16/749969
DATED : May 4, 2021
INVENTOR(S) : Fai Yeung et al.

Page 1 of 1

It is certified that error appears in the above-identified patent and that said Letters Patent is hereby corrected as shown below:

In the Claims

Column 12
Lines 1-2, "...previews..." should read – "...preview..."

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*